H. G. CORDLEY.
COMBINED LIQUID COOLER AND CARBONATOR.
APPLICATION FILED DEC. 27, 1911.

1,087,436.

Patented Feb. 17, 1914.

4 SHEETS—SHEET 1.

WITNESSES

INVENTOR
Henry G. Cordley
BY
Attorney

H. G. CORDLEY.
COMBINED LIQUID COOLER AND CARBONATOR.
APPLICATION FILED DEC. 27, 1911.

1,087,436.

Patented Feb. 17, 1914.
4 SHEETS—SHEET 3.

WITNESSES:

INVENTOR
Henry G. Cordley
BY
A. P. Greely
Attorney

H. G. CORDLEY.
COMBINED LIQUID COOLER AND CARBONATOR.
APPLICATION FILED DEC. 27, 1911.

1,087,436.

Patented Feb. 17, 1914.

4 SHEETS—SHEET 4.

WITNESSES:
Wm F. T Kay Ce.
Parker Cook

INVENTOR
Henry G. Cordley
BY
A. P. Greely
Attorney

UNITED STATES PATENT OFFICE.

HENRY G. CORDLEY, OF GLEN RIDGE, NEW JERSEY, ASSIGNOR, BY DIRECT AND MESNE ASSIGNMENTS, TO SAID HENRY G. CORDLEY, TRUSTEE.

COMBINED LIQUID COOLER AND CARBONATOR.

1,087,436.  Specification of Letters Patent.  Patented Feb. 17, 1914.

Application filed December 27, 1911. Serial No. 668,082.

*To all whom it may concern:*

Be it known that I, HENRY G. CORDLEY, a citizen of the United States, residing at Glen Ridge, in the county of Essex, State of New Jersey, have invented certain new and useful Improvements in Combined Liquid Coolers and Carbonators, of which the following is a description, reference being had to the accompanying drawings, forming a part hereof.

My invention relates to portable liquid cooling and dispensing devices particularly intended for dispensing cooled beverages either carbonated or plain and my invention has for its object the provision of a compact, inexpensive and efficient device adapted to be supplied with the beverage to be dispensed in comparatively small quantity; to cool a sufficient portion of the beverage supplied and to draw off the beverage so cooled as required either charged with carbonic acid or not.

With these and other objects as hereinafter explained in view, my invention consists in the construction and combination of elements hereinafter described and particularly pointed out in the claims.

Figure 1:
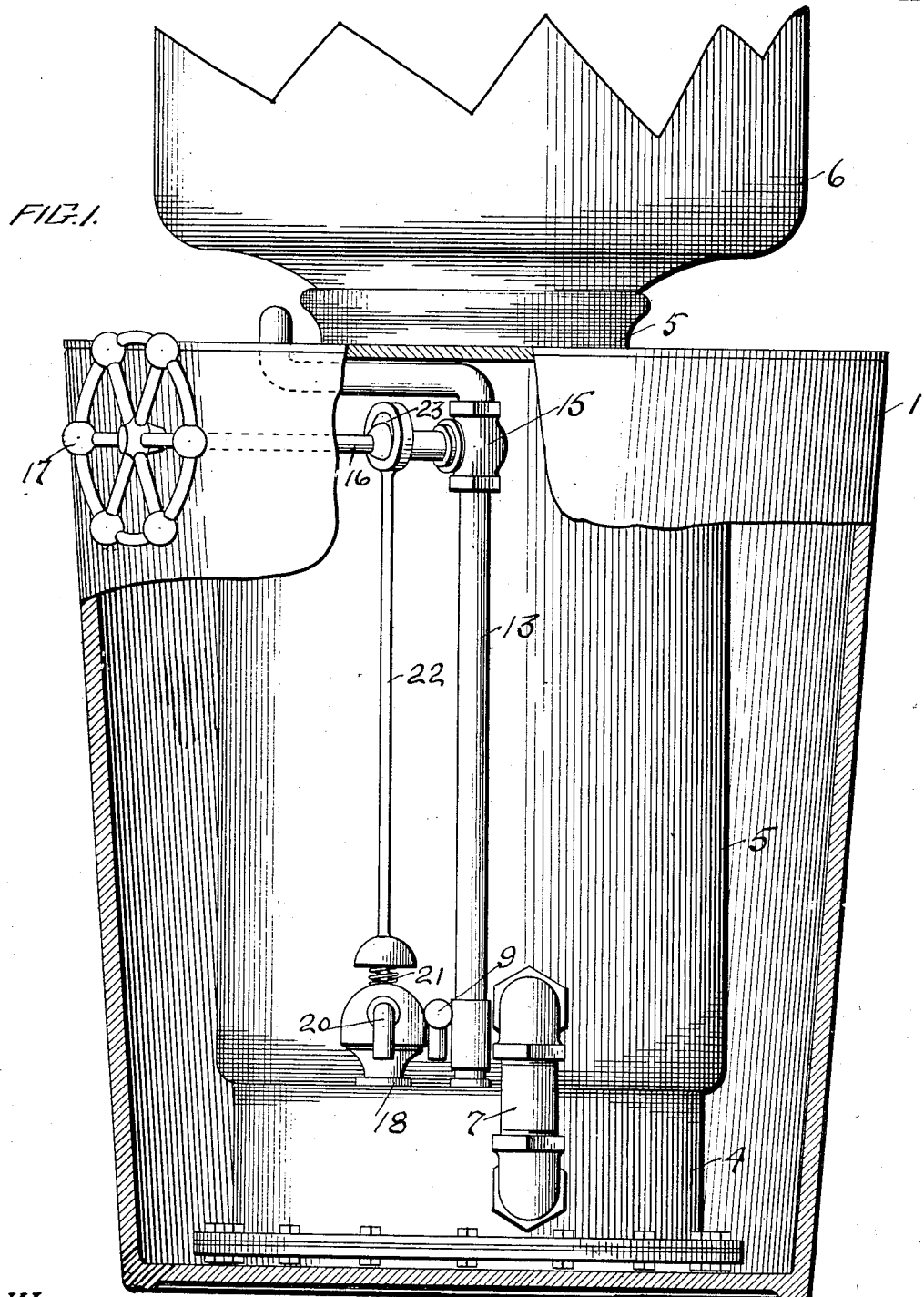
Figure 2:
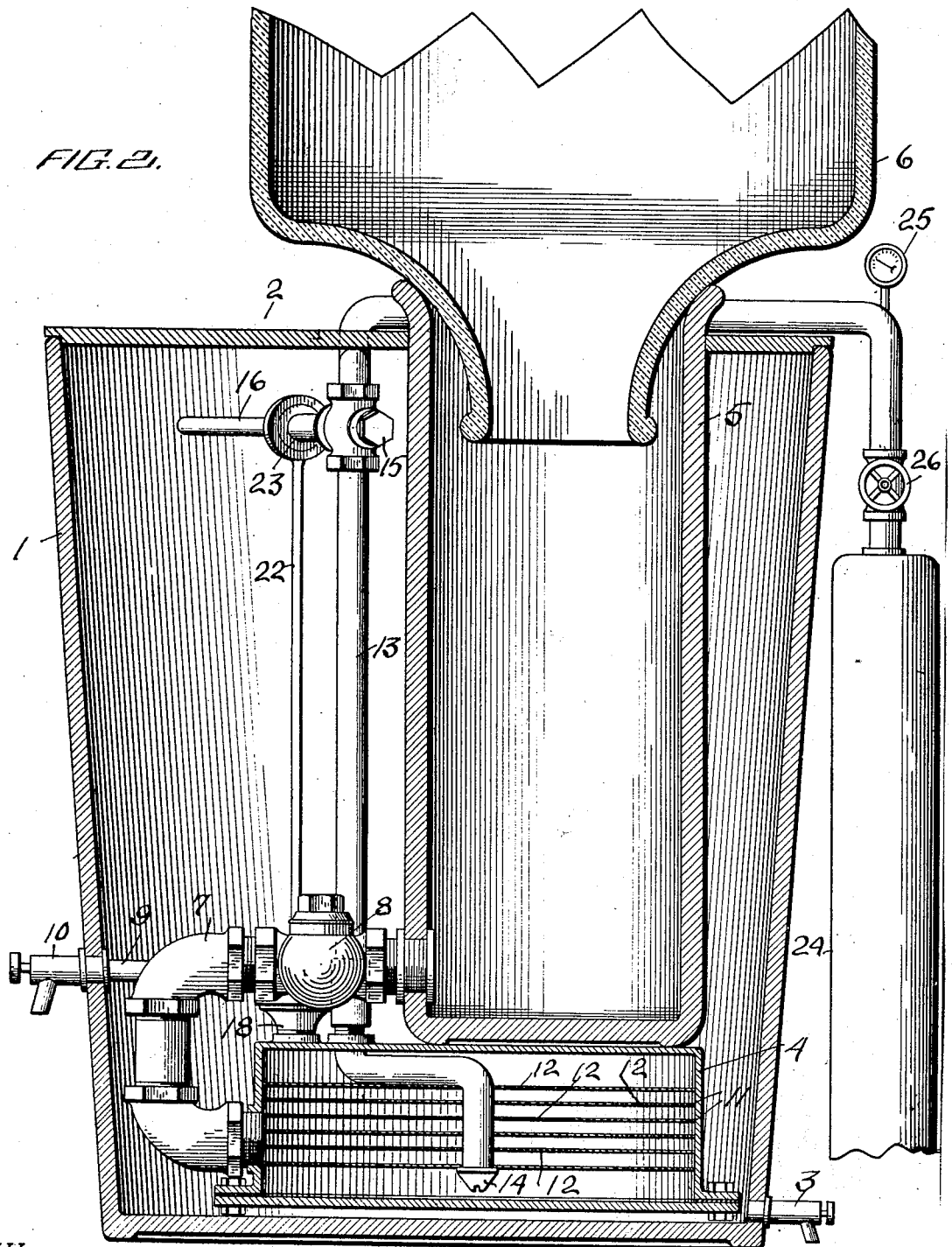
Figure 3:
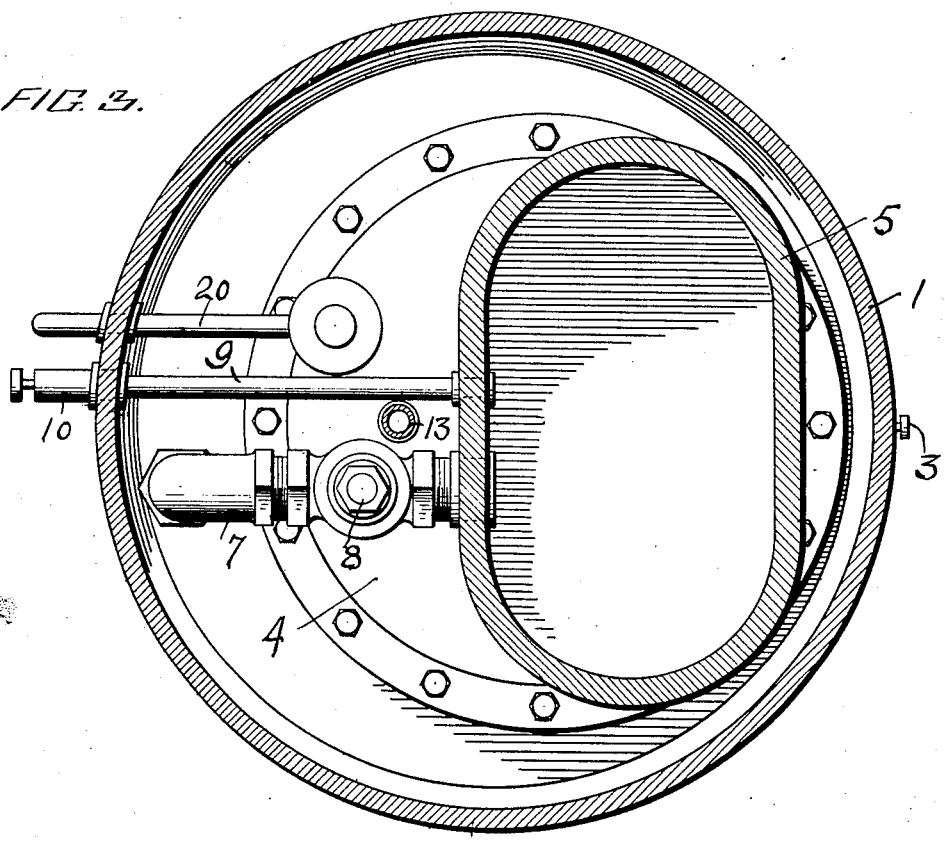
Figure 4:
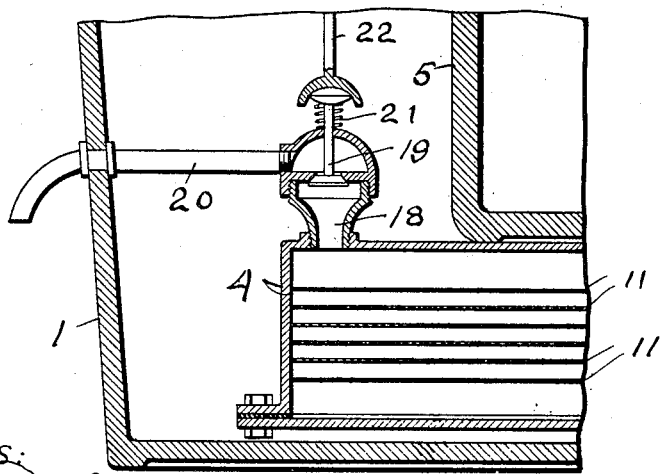
Figure 5:
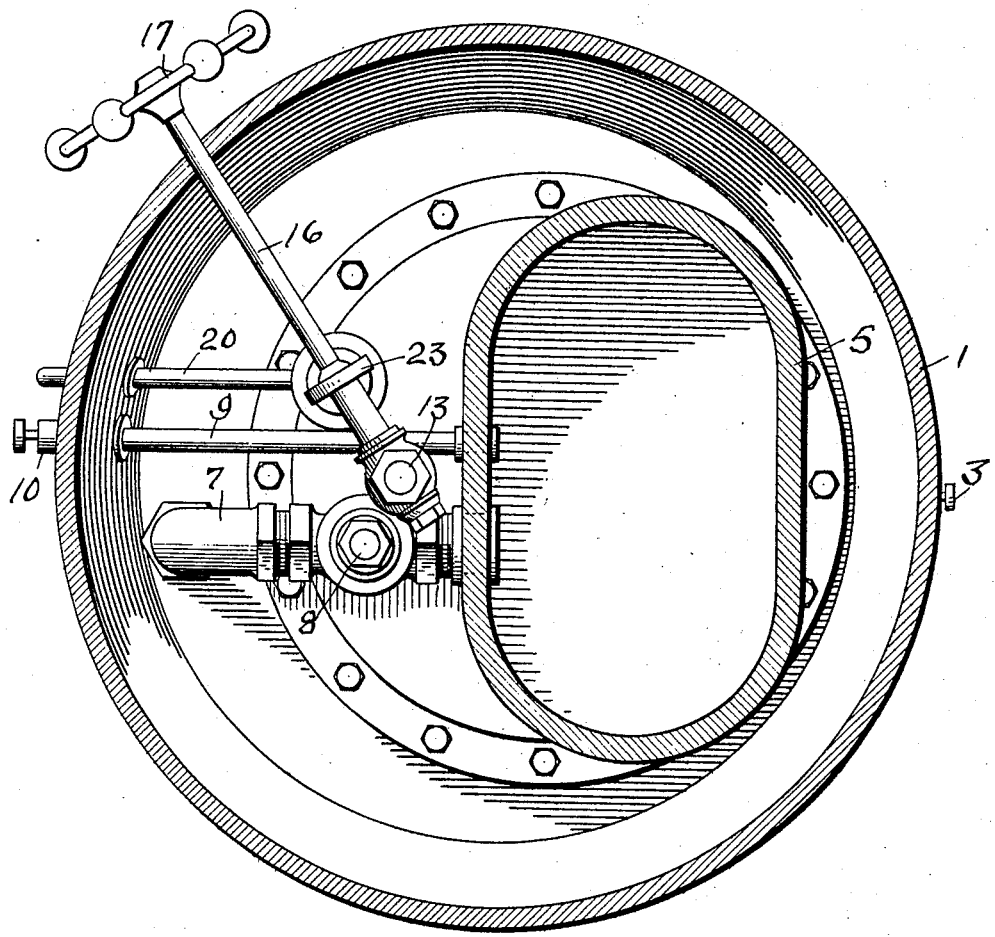
Figure 6:
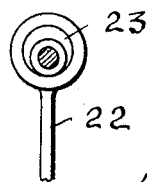

Referring to the drawings: Figure 1 is a front elevation of a device embodying my invention. Fig. 2 is a vertical sectional view of the device shown in Fig. 1. Fig. 3 is a horizontal sectional view on a plane about midway between the top and bottom of the ice receptacle. Fig. 4 is a vertical section of a portion of the device on the plane of the delivery valve. Fig. 5 is a horizontal sectional view on a plane near the top of the ice receptacle and Fig. 6 is a detail view of the eccentric for operating the delivery valve.

In the drawings 1 indicates an ice receptacle, preferably formed of wood fiber having an opening 2 in its top for introducing ice and a drain cock 3 near its bottom for drawing off water from the melting of the ice.

Within the ice receptacle and resting on its bottom is a carbonating device 4 having flat upper and lower faces and preferably circular in horizontal cross section. On the top of this carbonating device rests a liquid receptacle 5 preferably a jar of non metallic material and, in order to allow for ample space for ice within the ice receptacle, preferably elliptical in cross section as shown except at its upper end where it is circular in cross section to adapt it to receive the neck of an inverted demijohn or bottle 6.

From the side of the liquid receptacle 5 near its bottom a conduit 7 having in it a check valve 8 leads to the carbonating device 4 and a draw off tube 9 also leads from the liquid receptacle through the wall of the ice receptacle 1 and terminates in a faucet 10.

Within the carbonating device 4 are arranged a series of plates 11 one above the other each provided with groups of perforations 12, the groups of perforations 12 in each plate 11 being out of line with the groups of perforations in the plates immediately above and below it. The conduit 7 communicates with the space between the plates 11 so that the liquid to be carbonated enters above the lowermost plate 11 and in order to reach the bottom of the carbonating device must pass through one or more of the groups of perforations 12 of the plates 11.

A gas supply tube 13 extends downward through the ice receptacle through the top of the carbonating device and downward within the carbonating device terminating in a nozzle 14 in the space below the lowermost of the plates 11. This gas supply tube is provided with a valve 15 at any convenient point preferably near the top of the ice receptacle, which is operated through a rod 16 by a hand wheel 17.

The carbonating device is provided in its top with a discharge opening 18 controlled by a downwardly opening spring valve 19, the discharge opening being in communication when the valve is open, with a delivery tube 20 which extends through the wall of the ice receptacle. The valve 19 is normally closed by the pressure of the gas in the carbonating device and by the spring 21. A rod 22 rests on the end of the valve rod 22 and has its upper end controlled by an eccentric 23 on the rod 16, the eccentric being so arranged that on turning the hand wheel 17 in one direction the valve 15 is opened to admit carbonic acid to the carbonating device and the valve 19 is permitted to be closed by the spring 21 and the pressure of the gas in the tank. On turning the hand wheel in the other direction the supply of gas is shut off and at the same time the valve 19 is opened, permitting the charged liquid to be delivered through the delivery tube 20 into a drinking glass or other receptacle.

The gas supply tube 13 extends upward through the top of the ice receptacle, being suitably deflected to avoid the liquid receptacle 5 and extends rearward over the top of the ice receptacle and downward to a gas reservoir 24 as is ordinarily used in connection with soda water apparatus, which is provided with the usual pressure gage 25 and regulating valve 26.

In operation, a demijohn of liquid, which may be pure water, cider, lemonade, orangeade or any other beverage, is inverted and allowed to rest with its neck within the upper end of the water receptacle 5, the liquid flowing from the mouth of the demijohn until it stands in the water receptacle at the level of the mouth of the demijohn. The hand wheel being turned to open the valve 19 and close the valve 15 the liquid will flow from the liquid receptacle 5 through the conduit 7 into the carbonating device, filling it. When it is full the hand wheel is turned in the other direction, permitting the valve 19 to close and opening the valve 15 to permit gas under pressure, suitably regulated by the valve 26, to be discharged through the nozzle 14 into the carbonating device and passing through the perforations in the plate 11, to charge the liquid in the carbonating device. Whenever it is desired to draw a drink of the charged liquid the hand wheel is turned to shut off the gas supply and open the valve 19, the charged liquid flowing through the delivery tube 20 and the uncharged liquid entering through the tube 7.

It will of course be understood that as soon as the valve 15 is opened, creating pressure in the carbonating tank, the check valve 8 closes, preventing liquid from flowing back into the liquid receptacle.

In operation the carbonic acid gas, as it expands within the tube 13 absorbs heat and aids in cooling the liquid to be carbonated, which is already cooled by the ice in the ice receptacle. The ice and the carbonic acid thus coöperate to cool the liquid.

If the beverage is preferred uncharged it may be drawn direct from the liquid receptacle through the faucet 10, or, as will often be found desirable, part of the drinking glass may be partly filled with uncharged liquid and filled up with charged liquid from the delivery tube 20.

Having thus described my invention, what I claim is:

1. A combined liquid cooler and carbonator comprising a liquid receptacle, an ice receptacle surrounding it, a carbonating device arranged at the bottom of the ice receptacle in communication with the liquid receptacle, a supply tube for carbonic acid leading downward through the ice receptacle to the carbonating device, a delivery tube leading from the carbonating device, a valve controlling the delivery outlet, a valve in the carbonic acid supply tube and means for operating the two valves to simultaneously open one and close the other.

2. A combined liquid cooler and carbonator comprising a liquid receptacle, an inverted bottle resting thereon whose neck extends down into said receptacle, a carbonator placed below said liquid receptacle and connected thereto by a pipe, a check valve in said pipe discharging toward said carbonator, a supply pipe connected to said carbonator for supplying carbonic acid thereto, an ice receptacle completely surrounding said liquid receptacle and carbonator, a delivery outlet pipe connected to the top of said carbonator, a valve in said delivery outlet pipe, a valve in said carbonic acid supply pipe, means whereby the valves are operated simultaneously and in an opposite manner.

This specification signed and witnessed this twenty third day of December A. D. 1911.

HENRY G. CORDLEY.

In the presence of—
G. B. WILLIAMS,
WM. R. EES.